(12) United States Patent
Reinartz et al.

(10) Patent No.: US 7,427,647 B2
(45) Date of Patent: Sep. 23, 2008

(54) DURABLE COATING COMPOSITIONS CONTAINING ASPARTIC AMINE COMPOUNDS WITH IMPROVED POTLIFE

(75) Inventors: Stefan Reinartz, Wilmington, DE (US); Robert John Barsotti, Franklinville, NJ (US); Patrick Henry Corcoran, Cherry Hill, NJ (US); Kalindi Dogra, Wilmington, DE (US); Christian Peter Lenges, Wilmington, DE (US); Laura Ann Lewin, Greenville, DE (US); Klaus Wissing, Duesseldorf, DE (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 164 days.

(21) Appl. No.: 11/330,476

(22) Filed: Jan. 12, 2006

(65) Prior Publication Data

US 2006/0155055 A1 Jul. 13, 2006

Related U.S. Application Data

(60) Provisional application No. 60/643,516, filed on Jan. 13, 2005.

(51) Int. Cl.
*B05D 1/36* (2006.01)
*B05D 3/02* (2006.01)
*B05D 7/00* (2006.01)
*B32B 27/00* (2006.01)
*C08F 8/30* (2006.01)
*C08F 283/04* (2006.01)
*C08G 18/00* (2006.01)
*C08G 18/08* (2006.01)
*C08G 18/16* (2006.01)
*C08G 18/28* (2006.01)
*C08G 18/22* (2006.01)
*C08G 18/32* (2006.01)
*C08G 18/60* (2006.01)
*C08J 3/00* (2006.01)
*C08K 5/00* (2006.01)
*C08K 5/04* (2006.01)
*C08K 5/09* (2006.01)
*C08L 75/00* (2006.01)
*H01B 1/12* (2006.01)

(52) U.S. Cl. .................. 524/589; 427/372.2; 427/385.5; 427/402; 427/407.1; 427/409; 428/423.1; 428/425.8; 524/394; 524/398; 524/399; 524/507; 524/590; 525/123; 525/455; 528/44; 528/48; 528/55; 528/56; 528/84

(58) Field of Classification Search .............. 427/372.2, 427/385.5, 402, 407.1, 409; 428/423.1, 425.8; 524/394, 398, 399, 507, 589, 590; 525/123, 525/455; 528/44, 48, 55, 56, 49, 68, 84
See application file for complete search history.

(56) References Cited

U.S. PATENT DOCUMENTS

| 4,591,533 | A | 5/1986 | Antonelli et al. |
| 5,126,170 | A | 6/1992 | Zwiener et al. |
| 5,236,741 | A | 8/1993 | Zwiener et al. |
| 5,243,012 | A | 9/1993 | Wicks et al. |
| 5,412,056 | A | 5/1995 | Zwiener et al. |
| 5,516,873 | A | 5/1996 | Hicks et al. |
| 5,580,945 | A | 12/1996 | Wade et al. |
| 5,763,528 | A | 6/1998 | Barsotti et al. |
| 6,005,062 | A | 12/1999 | Hansen et al. |
| 6,221,494 | B1 | 4/2001 | Barsotti et al. |
| 2004/0001009 | A1 | 1/2004 | Winings et al. |

FOREIGN PATENT DOCUMENTS

| EP | 0 002 001 | 5/1979 |
| EP | 0 667 362 | 8/1995 |
| EP | 0 743 335 | 11/1996 |
| EP | 0 939 091 | 9/1999 |
| EP | 1 479 705 | 11/2004 |
| WO | WO 2006/066030 | 6/2006 |

OTHER PUBLICATIONS

Search Report for International Application Serial No. PCT/US2006/001635.

*Primary Examiner*—Patrick D Niland
(74) *Attorney, Agent, or Firm*—Sudhir Deshmukh

(57) ABSTRACT

A coating composition useful for coating automobile and truck bodies comprising a binder of
a. polyisocyanate crosslinking agent;
b. an isocyanate-reactive component having at least one compound having the following formula:

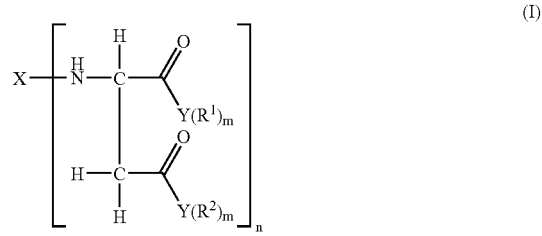

wherein

X, Y, $R^1$, $R^2$, m and n are described in the specification, and
c. 0.05 to 10% by weight, based on the total weight of the coating composition, of a metal alkoxide compound; and containing optional additional polymeric components, oligomeric components and antioxidants, light absorbers and light stabilizers.

35 Claims, No Drawings

DURABLE COATING COMPOSITIONS CONTAINING ASPARTIC AMINE COMPOUNDS WITH IMPROVED POTLIFE

CROSS-REFERENCE TO RELATED APPLICATION

This application claims the benefit of U. S. Provisional Application Ser. No. 60/643,516 filed on Jan. 13, 2005 which are hereby incorporated by references in its entirely.

BACKGROUND OF THE INVENTION

This invention is directed to coating compositions, in particular, to coating compositions that are useful as exterior clear finishes for automobiles and trucks.

DESCRIPTION OF THE PRIOR ART

The finishing system of choice presently being used on the exterior of automobiles and trucks comprises a clear coating applied over pigmented base coating that is applied over a primer coating. The clear coating provides protection, in particular, protection from weathering, to the pigmented base coating and improves the appearance of the overall finish, in particular, provides improved gloss and distinctness of image. The primer coating provides adhesion to the substrate and, in particular, provides resistance to stone chipping. When used in refinishing of automobile and truck bodies, the clear coating and primer coating are required to have an acceptable "pot life" and reasonably short cure time period to allow for application of a subsequent coat and in the case of a clear coating to allow for further processing or handling of the vehicle without damaging the finish. The term "pot life" means the period of time after a coating is mixed with a crosslinking agent, with or without a catalyst, in which the composition remains at a sprayable viscosity.

The following U.S. patents: U.S. Pat. Nos. 5,516,873, 5,126,170, 5,243,012, 5,236,741, 5,412,056, 5,580,945, and U.S. Pat. No. 6,005,062, show a variety of coating composition that contain polyaspartic acid derivatives but these compositions do not have a property balance of acceptable pot life and rapid curing time to form a sufficiently hard finish to allow additional handling and processing of a coated vehicle or work piece after the coating composition has been applied.

EP 0667362 teaches that the addition of a water adsorbing zeolite improved the pot life of coating compositions containing polyaspartic acid derivatives. The required levels of zeolite are indicated with 0.5-10 wt. %, with a practical range of several percent of zeolite additive. A typical zeolite may be capable to absorbing up to 25% of its own weight in water. Especially for clearcoat applications the addition of high levels of zeolite may result in coatings with inferior appearance characteristics. The sensitivity of these coating systems based on polyaspartic acid derivatives to the water content has been discussed (D. A. Wicks and P. E. Yeske, Waterborne & Higher Solids and Powder Coatings Symposium, Feb. 24-26, 1993).

To improve the rate of curing, EP 0939091 uses amine compounds. A typical examples of such amine compound is the reaction product of 4,4'-methylenebiscyclohexanamine with two moles of diethyl maleate. However, coating composition formulated with these reactive amines do not have the desired balance of acceptable pot-life and the desired cure rate after application to an object while maintaining or improving on the desired properties of the resulting finish. In an effort to improve pot life, solvents and catalysts have been used but solvents have a deleterious effect on VOC (volatile organic content) emissions, which is undesirable and traditional catalysts can result in deterioration of film properties, such as durability.

It is, therefore, desired to improve the pot life of coatings systems based on the use of polyaspartic acid derivatives while the film drying characteristics are not negatively impacted in the reaction with isocyanates to form coating compositions that overcome these problems. It is desired to reduce the water dependent variability of the pot life of coating systems using polyaspartic acid derivatives without limiting the use of these polyaspartic acid derivatives in all coating layers. It has been found that the pot life of coating compositions can be improved by the use of compounds with hydrolyzable groups, especially metal alkoxides. It is surprising that compounds, such as metal alkoxides, do not interfere with the coating reaction but increase the pot life.

SUMMARY OF THE INVENTION

A coating composition comprising a binder of a. polyisocyanate crosslinking agent;

b. an isocyanate-reactive component having at least one compound having the following formula:

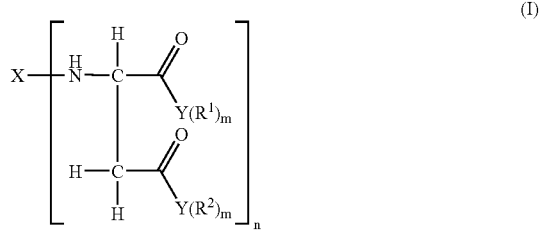

(I)

wherein
    X is an aliphatic or cycloaliphatic group, wherein
    n is, on average, 2 to 4, preferably, on average, 2, wherein
    Y can be independently O or N; if Y is equal to O, m equals 1 and if Y is equal to N, m equals 2;
    if Y is equal to O, $R^1$ and $R^2$ are the same or different organic groups that are inert to isocyanate groups,
    if Y is equal to N, $R^1$ and $R^2$ are H, or the same or different organic groups that are inert to isocyanate groups with the proviso that at least one of $R^1$ and $R^2$ is not H;

c. 0.05 to 10% by weight, based on the total weight of the coating composition, of a metal alkoxide compound;

d. optionally, a polymeric component having a number average molecular weight of 5,000 to 50,000 having reactive groups that crosslink with an isocyanate, where the reactive groups are hydroxyl, carboxyl, glycidyl, amine and any mixtures thereof; and e. optionally, an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof;

f. optionally,
   (1) a disubstituted phenol antioxidant or a hydroperoxide decomposer,
   (2) an ultraviolet light absorber, and
   (3) a hindered amine light stabilizer.

Two component compositions formulated with the above constituents and substrates, such as, automotive and truck bodies and parts coated with the novel composition are also part of this invention.

DETAILED DESCRIPTION OF THE INVENTION

The features and advantages of the present invention will be more readily understood, by those of ordinary skill in the art, from reading the following detailed description. It is to be appreciated that those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference in their entirety.

A typical auto or truck body is produced from a steel sheet or a plastic or a composite substrate. For example, the fenders may be of plastic or a composite and the main portion of the body of steel. If steel is used, it is first treated with an inorganic rust-proofing compound, such as, zinc or iron phosphate and then a primer coating is applied generally by electrodeposition. Typically, these electrodeposition primers are epoxy-modified resins crosslinked with a polyisocyanate and are applied by a cathodic electrodeposition process. Optionally, a primer can be applied over the electrodeposited primer, usually by spraying, to provide better appearance of a base coating or a mono coating applied over the primer and to improve the adhesion of such coatings to the primer or both of the above. A mono coating of a pigmented coating composition then can be applied but preferably, a pigmented base coating with a clear top coating is applied to form a clear coat/color coat finish on the truck or automobile body or auto or truck part. Usually, after application, each of the coatings may be cured at ambient temperature or by baking at an elevated temperature. It is generally known that a clear top coating can be applied over the base coating and both coatings cured together at an elevated temperature.

When refinishing automobile and truck bodies, the original OEM topcoat is usually sanded and a primer or sealer coat applied and then a mono coat or a basecoat/clear coat is applied. These coatings are usually cured at ambient temperatures or at slightly elevated temperatures, such as, 40 to 100° C.

A "clear coating composition" for automotive use is a composition that forms a transparent finish upon curing and typically has a DOI (distinctness of image) of more than 70 and a 20° gloss of more than 70. These clear coatings provide a glossy in depth appearance to the finish on the automobile or truck and therefore, are required to have good gloss and distinctness of image. Also, the clear finish also provides a protective finish that is durable and resistant to scratching, marring and chipping and also provides resistance to weathering, in particular to U.V. degradation and photo-oxidation.

A "matte clear coating composition" can also be used, for example for the interior of an automobile or truck. These matte finishes have a substantially lower gloss, for example, a 20° gloss of 20 or less and very low DOI.

Typical "primer compositions" provide adhesion to be substrate and for the novel compositions of this invention provide excellent adhesion to bare metal substrates, such as, steel, aluminum and treated metal substrates, such as galvanized steel and provide a surface to which the topcoat, such as, a pigmented mono coat or the basecoat of a basecoat/clear coat finish.

The term "binder" as used herein refers to the film forming constituents of the composition that include the isocyanate reactive component, i.e., having functional groups that are reactive with isocyanates and comprising active hydrogen, and optional polymeric and/or oligomeric components, polyisocyanate crosslinking agents and optional reactive diluents, such as, ketimines and aldimines and optional acrylic non-aqueous dispersions. Solvents, pigments, catalysts, rheology modifiers, antioxidants, U.V. absorbers, hindered amine light stabilizers, antioxidants, in particular disubstituted phenolic compounds, hydroperoxide decomposers, leveling agents, antifoaming agents, anti-cratering agents, adhesion promoting agents are not included in the term.

Molecular weight (both number and weight average) is determined by gel permeation chromatography utilizing a high performance liquid chromatograph supplied by Hewlett-Packard, Palo Alto, Calif. and unless otherwise stated the liquid phase used was tetrahydrofuran and the standard was polymethylmethacrylate or polystyrene.

"Tg" (glass transition temperature) is in ° C. and determined by Differential Scanning Calorimetry or calculated according to the Fox Equation.

Typically the binder of the novel composition comprises 20 to 80% by weight, based on the weight of the binder, of the isocyanate reactive component or aspartic acid derivative and 20 to 80% by weight, based on the weight of the binder, of a polyisocyanate crosslinking agent. The stochiometric ratio of isocyanate functionality to isocyanate reactive component is 0.5 to 3.0, preferably, 0.8 to 2.0 and most preferably, 1.0 to 1.5. Optionally, the binder can contain up to 75% by weight, preferably, 5 to 60% by weight, and most preferably, 5 to 30% by weight, based on the weight of the binder, of a polymeric or oligomeric component or both wherein the component contains groups that are reactive with the polyisocyanate crosslinking agent. One preferred binder composition contains 25 to 50%, by weight of the isocyanate reactive component, 5 to 30% by weight of the polymeric or oligomeric component or both and 20 to 70% by weight of a polyisocyanate, wherein the sum of all of the components of the binder is 100%. Another preferred binder composition contains the isocyanate reactive component as the sole nucleophilic component that is reactive with the polyisocyanate.

Particular advantages of the novel coating composition of this invention is that it provides a protective clear finish and a primer finish that have an excellent balance between pot life and cure characteristics once applied to the object. Also, the resulting clear finish has good gloss and distinctness of image that provides an excellent appearance. The clear finish hardens in a reasonably short time after application and has excellent weatherability, in particular resistance to U.V. degradation and photo-oxidation when properly reinforced with the appropriate additives. When the novel composition is used as a primer to refinish automobiles and trucks, it has excellent adhesion to bare and treated metal substrates and cures to a tack free state in a relatively short period of time under ambient temperatures or under slightly elevated drying temperatures, for example, 40 to 100° C., that allows a coated vehicle to be moved or further processed without damage to the finish.

The novel composition of this invention can contain pigments and is useful as a pigmented mono-coat topcoat, as a pigmented base coat of a base coat/clear coat finish or as a primer or primer surfacer, which cures in a relatively short period of time to allow for subsequent application of topcoats, basecoat/clear coats or monocoats. The novel composition can also be used for OEM (original equipment manufacture) of automobiles, trucks and parts thereof.

The novel composition typically is solvent based and has a solids content of film forming binder of 20 to 90% by weight, preferably, 40 to 80% by weight. It may be possible to formulate a 100% solids composition with the use of reactive diluents or when applied at high viscosities by, for example, using airless spray equipment or when used as a putty.

An aqueous liquid carrier, which typically is water but may contain other liquids, may be used in place of the solvent. Before application a sufficient amount of liquid usually is added, for example, water or solvents, to reduce the composition to a spray viscosity. In the event the novel coating composition is an aqueous based composition, the composition typically has a pH of 6.0 to 10.0 and preferably, 7.5 to 8.5.

The isocyanate reactive component of the novel composition is an aspartic acid derivative and has the formula

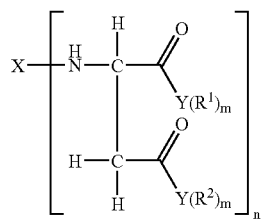

wherein
X represents an organic group such as an aliphatic or cycloaliphatic group which has the valency of n and is inert towards isocyanate groups, preferably a divalent hydrocarbon group obtained by the removal of the amino groups from an aliphatic, araliphatic or cycloaliphatic polyamine, more preferably a diamine, wherein
n is, on average, 2 to 4, preferably, on average, 2, wherein
Y can be independently O or N; if Y is equal to O, m equals 1 and if Y is equal to N, m equals 2;
if Y is equal to O, $R^1$ and $R^2$ are the same or different organic groups that are inert to isocyanate groups,
if Y is equal to N, $R^1$ and $R^2$ are H, or the same or different organic groups that are inert to isocyanate groups with the proviso that at least one of $R^1$ and $R^2$ is not H;

The isocyanate reactive compounds of this invention are prepared in a reaction of the corresponding primary polyamines corresponding to the formula (II)

$$X-(NH_2)_n$$

with a maleic or fumaric acid ester of the general formula (III)

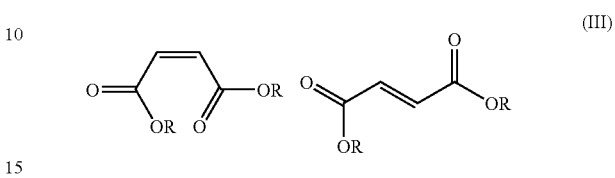

with R equal to $R^1$ and/or $R^2$ as described above.

Suitable polyamines include ethylene diamine, 1,2-diaminopropane, 1,4-diaminobutane, 1,3-diaminopentane, 1,6-diaminohexane, 2,5-diamino-2,5-dimethylhexane, 2,2,4-and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4,- and/or 2,6,-hexahydrotoluylene diamine, 2,4'- and/or 4,4'-diamino-dicyclohexyl methane, and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,5- and/or 2,6-bis-(aminomethyl)-bicyclo[2.2.1]-heptane, substituted 2,5- and/or 2,6-bis-(aminomethyl)-bicyclo[2.2.1]-heptane (such as of 2-methyl-2,5 and/or 2,6- bis-(aminomethyl)-bicyclo[2.2.1]heptane, 6- and/or 7-bis-(aminomethyl)-1,2,3,4,4α,5,6,7,8,8α-decahydro-2-methyl-1,4:5,8-dimethano-naphthalene-2, 3-ethyl—2,5 and/or 2,6- bis-(aminomethyl)-bicyclo[2.2.1]heptane), octahydro-4,7-methano-1H-indene-2,5-dimethanamine, aminomethyl-cyclooctyl-methanamine, and aminomethyl-cyclododecyl-methanamine.

Preferred are 1,4-diaminobutane, 1,6-diaminohexane, 2,2,4-and 2,4,4-trimethyl-1,6-diamino-hexane, 1,3-and/or 1,4-cyclohexane diamine, 1-amino-3,3,5-trimethyl-5-aminomethyl-cyclohexane, 2,4- and/or 2,6-hexahydrotoluylene diamine, 4,4'-diamino-dicyclohexyl methane, 3,3-dimethyl-4,4'-diamino-dicyclohexyl methane, 3,3-diethyl-4,4'-diaminodicyclohexyl methane, 2,5- and/or 2,6-bis-(aminomethyl)-bicyclo[2.2.1 ]-heptane, 2-methyl-2,5 and/or 2,6- bis-(aminomethyl)-bicyclo[2.2.1]heptane, 6- and/or 7-bis-(aminomethyl)-1,2,3,4,4α,5,6,7,8,8α-decahydro-2-methyl-1,4:5,8-dimethano-naphthalene-2), 3-ethyl-2,5 and/or 2,6-bis-(aminomethyl)-bicyclo[2.2.1]heptane, octahydro-4,7-methano-1H-indene-2,5-dimethanamine, aminomethyl-cyclooctyl-methanamine, aminomethyl-cyclododecyl-methanamine.

Also, suitable, though less preferred are the aromatic polyamines, such as, 2,4- and/or 2,6-diaminotoluene and 2,4'- and/or 4,4'-diaminodiphenyl methane. Relatively high molecular weight polyether polyamines containing aliphatically bound primary amino groups, for example, the products marketed under the Jeffamine® trademark by Texaco, are also suitable.

Other aspartic acid derivates that can be used in this invention are disclosed in the following: U.S. patents: U.S. Pat. Nos. 5,516,873, 5,126,170, 5,243,012, 5,236,741, 5,412,056, 5,580,945 and U.S. Pat. No. 6,005,062 and other useful non-hydroxyl polyaspartic compounds are disclosed in U.S. Ser.

No. 60/636,297, filed on Dec. 15, 2004 and U.S. Ser. No. 60/636,350 filed Dec. 15, 2004. All the above are hereby incorporated by reference.

For the synthesis of the isocyanate reactive components of this invention useful maleic or fumaric acid esters are for example dimethylmaleate, diethylmaleate, di-n-butylmaleate, di-sec-butylmaleate, di-cyclohexyl-maleate and the corresponding fumaric acid esters. Mixed maleic or fumaric esters are also applicable, such as butyl-ethyl-maleate. In addition, maleic or fumaric ester amides are useful for the synthesis of the isocyanate reactive components, for example, isopropyl 4-oxo-4-(piperidin-1-yl)but-2-enoate, ethyl 3-(pentylcarbamoyl)-acrylate, butyl 3-(isopropylcarbamoyl)-acrylate, methyl 3-(diethylcarbamoyl)-acrylate. In addition maleic or fumaric amides are applicable, for example, tetra-ethylfumaramide.

The preparation of the isocyanate reactive components of this invention from the indicated starting materials may be carried out in a temperature range of 0 to 100° C. The mole-ratios of starting materials used of these reactions are such that for each primary amine functional group at least one and preferentially one equivalent of maleic or fumaric acid ester is used. Optional starting materials, which are used in excess in this reaction, can be separated from the product mixture using methods known to those skilled in the art, such as, distillation or chromatography. The reaction can be carried out using the starting materials directly or in the presence of a solvent, such as, methanol, ethanol, propanol, tetrahydrofuran, dioxan, toluene, xylenes, acetonitrile or mixtures of such solvents.

The metal alkoxide compounds are added to the coating compositions in an amount sufficient to capture preferably 100% of the water present in the coating compositions. Excess amounts may be added but do not provide any significant benefit. The amount of metal alkoxide compound necessary may be estimated based on the valency of the metal alkoxide and the water content in the polyaspartic acid derivatives. For example, a metal alkoxide such as $Ti(OiPr)_4$ may convert four mole equivalents of water which translates into high equivalent weight effectiveness of these additives.

Generally, the methods described above are implemented if the metal alkoxides are added at a minimum amount of 0.05 weight percent, preferably, at least 0.1 weight percent, based on the total weight of the coating composition, a maximum amount of up to 10 weight percent may be added.

The coating compositions of this invention contain one or several compounds of formula (IV)

$$M(R^3)_q \quad (IV)$$

wherein M is equal to an element or a compound selected from a group consistent of Ti, Zr, Sn, Ce, Al, B, VO, In and Zn, and wherein $R^3$ is a substituent that may undergo hydrolysis and wherein q is equal to an integer from 2 to 4.

Preferably, compounds of formula (IV) of this invention are $$M(R^3)_q$$

wherein M describes $Ti^{+4}$, $Zr^{+4}$, $Sn^{+4}$, $Ce^{+4}$, $Al^{+3}$, $B^{+3}$, $VO^{+3}$, $In^{+3}$ and $Zn^{+2}$, and wherein $R^3$ is a substituent that may undergo hydrolysis and wherein q in the case of elements with valency four equals to 4, q in the case of elements with valency three equals to 3, and q in the case of elements with valency two equals to 2. Preferred elements for M are $Ti^{+4}$, $Zr^{+4}$. Some of the aforementioned compounds are relatively difficult to dissolve in typical solvents used; however, one skilled in the art will readily be able to determine the correct solvent or mixture of solvents required to adequately dissolve the compounds under normal reaction conditions.

Examples of substituents that may undergo hydrolysis are alkoxy (especially $C_{1-4}$-alkoxy such as methoxy, ethoxy, n-propoxy, iso-propoxy, n-butoxy, iso-butoxy, sec-butoxy, tert. butoxy), aryloxy (especially $C_{6-10}$-aryloxy, for example phenoxy or cresoxy) and alkycarbonyl (for example acetyl groups). Especially preferred substituents that may undergo hydrolysis are alkoxy groups, especially ethoxy and iso-propoxy.

Specific examples for compounds of formula (IV) are listed below. This list is only a selection of examples and is not intended to be limiting the scope of compounds of formula (IV):

$Ti(OC_2H_5)_4$, $Ti(OC_3H_7)_4$, $Ti(O-iso-C_3H_7)_4$, $Ti(OC_4H_9)_4$, $Ti(O-iso-C_4H_9)_4$, $Ti(O-sec-C_4H_9)_4$, $Ti(2-ethylhexoxy)_4$, $Zr(OC_2H_5)_4$, $Zr(OC_3H_7)_4$, $Zr(O-iso-C_3H_7)_4$, $Zr(OC_4H_9)_4$, $Zr(2-ethylhexoxy)_4$, $Al(OCH_3)_3$, $Al(OC_2H_5)_3$, $Al(OC_3H_7)_3$, $Al(O-iso-C_3H_7)_3$, $Al(OC_4H_9)_3$, $Al(O-iso-C_4H_9)_3$, $Al(O-sec-C_4H_9)_3$, $B(OCH_3)_3$, $B(OC_2H_5)_3$, $B(OC_3H_7)_3$, $B(O-iso-C_3H_7)_3$, $B(OC_4H_9)_3$, $Sn(OCH_3)_4$, $Sn(OC_2H_5)_4$, $VO(OCH_3)_3$, $Al(OC_2H_5)_3$, $Al(OC_3H_7)_3$, $Al(O-iso-C_3H_7)_3$, $Ce(OC_4H_9)_4$, $Ce(O-iso-C_4H_9)_4$, and $Ce(2-ethylhexoxy)_4$.

Additional useful titanate compounds are disclosed in Lengnick U.S. Pat. No. 3,619,255, which is hereby incorporated by reference. Particularly useful are titanates of the formula $(Ti)_h(O)_i(OR^8)_j$ wherein $R^8$ is an organic radical having 1-20 carbon atoms, h is an integer of at least 2, i is an integer of at least 1 and j is an integer of at least 4.

The novel coating composition can contain optional polymeric components. These components have groups that are reactive with isocyanate and can be used in an amount of up to 75% by weight, preferably, 1 to 60% by weight, based on the weight of the binder. One preferred polymeric component is an acrylic polymer. Typically useful acrylic polymers have a number average molecular weight of about 5,000 to 50,000, a Tg of 10 to 80° C. and contain moieties, such as acetoacetate, aldimine, ketimine, mercaptan, hydroxyl, carboxyl, glycidyl and amino groups. Typically useful acrylic polymers are those known in the art and are polymers of two or more of the following: linear alkyl (meth)acrylates having 1 to 12 carbon atoms in the alkyl group, cyclic or branched alkyl (meth)acrylates having 3 to 12 carbon atoms in the alkyl group including isobornyl (meth)acrylate, hydroxy alkyl (meth)acrylates having 1 to 4 carbon atoms in the alkyl group, glycidyl (meth)acrylate, hydroxy amino alkyl (meth)acrylates having 1 to 4 carbon atoms in the alkyl group, and can contain styrene, alpha methyl styrene, vinyl toluene, (meth)acrylonitrile (meth)acryl amides, (meth)acrylic acid, (meaning both acrylic acid and methacrylic acid) trimethoxysilylpropyl (meth)acrylate and the like.

Preferred are hydroxy functional acrylic polymers having a hydroxy equivalent weight of 300 to 1300 and are polymers of hydroxy alkyl (meth)acrylates and one or more of the aforementioned monomers. One preferred hydroxy containing acrylic polymer contains 35 to 50% by weight styrene, 15 to 25% by weight ethylhexyl methacrylate and 15 to 20% by weight isobornyl methacrylate and 20 to 30% by weight hydroxyethyl methacrylate. A particularly preferred acrylic polymer contains 37% styrene, 20% by weight 2-ethylhexyl methacrylate and 17.5% by weight of isobornyl methacrylate and 25.5% by weight hydroxyethyl methacrylate.

Acrylic oligomers having a number average molecular weight of 300 to 3,000 of the aforementioned monomeric components also can be used as the optional polymeric component. By using monomers and reactants well known to those skilled in the art, these oligomers can have the one or more of the following groups that are reactive with isocyanate: hydroxyl, carboxyl, glycidyl, amine, aldimine, phosphoric acid and ketimine. Typically useful acrylic oligomers are disclosed in Ser. No. 10/617,585 filed Jul. 11, 2003, publication number 2004/001009, published on Jan. 15, 2004 which is hereby incorporated by reference.

Polyesters can also be used as the optional polymeric component, such as, hydroxyl or carboxyl terminated or hydroxyl or carboxyl containing polyesters. The following are typically useful polyesters or ester oligomers: polyesters or oligomers of caprolactone diol and cyclohexane dimethylol, polyesters or oligomers of tris-hydroxy ethylisocyanurate and caprolactone, polyesters or oligomers of trimethylol propane, phthalic acid or anhydride and ethylene oxide, polyesters or oligomers of pentaerythritol, hexahydrophthalic anhydride and ethylene oxide, polyesters or oligomers of pentaerythritol, hexahydrophthalic anhydride and butylene oxide, such as those shown in U.S. Pat. No. 6,221,494 B1 which is hereby incorporated by reference.

The aforementioned polyesters and oligomers can be reacted with an organic isocyanate to form urethane polymers and oligomers that can be used as the optional polymeric component in the novel composition.

One useful urethane oligomer that can used in the novel composition is formed by reacting an aliphatic polyisocyanate with an aliphatic or cycloaliphatic monohydric alcohol and subsequently reacting the resulting composition with a hydroxy functional aliphatic carboxylic acid until all of the isocyanate groups have been reacted. One useful polyurethane oligomer comprises the reaction product of the isocyanurate of hexane diisocyanate, cyclohexanol and dimethylol propionic acid. A water dispersible oligomer can be formed using conventional techniques know to those skilled in the art.

Optionally, an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof can be added to the novel composition.

Typically useful organic polyisocyanates crosslinking agents that can be used in the novel composition of this invention include aliphatic polyisocyanates, cycloaliphatic polyisocyanates and isocyanate adducts.

Examples of suitable aliphatic and cycloaliphatic polyisocyanates that can be used include the following: 4,4'dicyclohexyl methane diisocyanate, ("$H_{12}$MDI"), trans-cyclohexane-1,4-diisocyanate, 1,6-hexamethylene diisocyanate ("HDI"), isophorone diisocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate and the isocyanurate of hexane diisocyanate.

Tri-functional isocyanates also can be used, such as, Desmodur® N 3300, trimer of hexamethylene diisocyanate, Desmodur® 3400, trimer of isophorone diisocyanate, Desmodur® 4470 trimer of isophorone diisocyanate, these trimers are sold by Bayer Corporation. A trimer of hexamethylene diisocyanate sold as Tolonate® HDT from Rhodia Corporation is also suitable.

An isocyanate functional adduct can be used, such as, an adduct of an aliphatic polyisocyanate and a polyol. Also, any of the aforementioned polyisocyanates can be used with a polyol to form an adduct. Polyols, such as, trimethylol alkanes, particularly, trimethylol propane or ethane can be used to form an adduct.

The novel composition can contain 1 to 30% by weight, based on the weight of the binder of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NADs is found in Antonelli et al. U.S. Pat. No. 4,591,533 and in Barsotti et al. U.S. Pat. No. 5,763,528 which patents are hereby incorporated by reference. Optionally, a catalyst is used in the novel composition to reduce curing time and temperature and allow curing of the coating at ambient temperatures. Useful catalysts include alkyl carboxylic acids having 1 to 12 carbon atoms in the alkyl group, such as, acetic acid, formic acid, glycolic acid; aromatic acids, such as, benzoic acid; salicylic acid; and oligomers having pendant acid groups.

It is also possible to incorporate other additives, which increase the pot life of compositions containing polyisocyanates and polyaspartic acid derivatives, such as the tin compounds disclosed in U.S. Pat. No. 5,243,012, the disclosure of which is herein incorporated by reference.

The coating composition optionally includes a catalytic amount of a catalyst for modifying the curing process. Generally, in the range of about 0.001 percent to about 5 percent, preferably in the range of from 0.005 percent to 2 percent, more preferably in the range of from 0.01 percent to 1 percent of the catalyst is utilized, all in weight percent based on the total weight of crosslinkable and crosslinking component solids. A wide variety of catalysts can be used, such as, tin compounds, including dibutyl tin dilaurate and dibutyl tin diacetate. These catalysts can be used alone or in conjunction with the carboxylic acids described above, such as, acetic acid. One of the commercially available catalysts, sold under the trademark, Fastcat® 4202 dibutyl tin dilaurate by Elf-Atochem North America, Inc. Philadelphia, Pa., is particularly suitable.

If used as a clear coat or mono-coat, the novel composition optionally contains about 0.1 to 5% by weight, based on the weight of the binder, of ultraviolet light absorbers. Typically useful ultraviolet light absorbers include hydroxyphenyl benzotriazols, such as, 2-(2-hydroxy-5-methylphenyl)-2H-benzotriazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4, 6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

If used as a clear coat or mono-coat, the novel composition optionally contains about 0.1 to 5% by weight, based on the weight of the binder, of a di-substituted phenol antioxidant or a hydroperoxide decomposer. Typically useful antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

If used as a clear coat or mono-coat, the novel composition optionally contains about 0.1-5% by weight, based on the weight of the binder, of hindered amine light stabilizers. Typically useful hindered amine light stabilizers include N-(1,2,2,6,6-pentamethyl4-piperidinyl)-2-dodecyl succinimide, N(1acetyl-2,2,6,6-tetramethyl4-piperidinyl)-2-dodecyl succinimide, N-(2 hydroxyethyl)-2,6,6,6-tetramethylpiperidine4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanedily]]bis[N, N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4 hydroxy-phenyl) methyl]butyl propanedioate, 8-acetyl-3-dodecyl-7,7,9,9,-tetramethyl-1,3,8-triazaspiro(4,5)decane-2,4-dion, dodecyl/tetradecyl-3-(2,2,4,4-tetramethyl-2l-oxo-7-oxa-3,20-diazal dispiro(5.1.11.2)henicosan-20-yl)propionate.

To form a coating composition that has a high level of weatherability and resistance to UV degradation, a combination of above described ultraviolet light absorbers, antioxidants and hindered amine light stabilizers can be used.

Typically, the composition is a solvent based composition and any of the known organic solvents may be used to form the coating composition. Typical solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate; and mixtures of any of the above.

The novel coating composition may also include other conventional formulation additives, such as, wetting agents, leveling and flow control agents, for example, Resiflow® S (polybutylacrylate), BYK® 320 and 325 (high molecular weight polyacrylates), BYK® 347 (polyether-modified siloxane), rheology control agents, such as, fumed silica, defoamers, surfactants and emulsifiers to help stabilize the composition. Other additives that tend to improve mar resistance can be added, such as, silsesquioxanes and other silicate-based micro-particles.

The coating composition of this invention can be used as a clear coat that is applied over a pigmented base coat that may be a pigmented version of the composition of this invention or another type of a pigmented base coat. The coating composition can be used as a matte clear coating composition to provide relatively low gloss matte finishes, particularly useful for the interior of automobiles and trucks. The clear coating can be in solution or in dispersion form.

Typically, a clear coating is then applied over the base coating before the base coating is fully cured, a so called "wet-on-wet process", and the base coating and clear coating are then fully cured at ambient temperatures or can be cured by heating to elevated temperatures of 40° C. to 170° C. for 15 to 45 minutes. If used in refinishing vehicles, the base coat may be allowed to "dry to the touch" at ambient temperature conditions or under warm air before the clear coating is applied. The base coating and clear coating preferably have a dry coating thickness ranging from 25 to 75 microns and 25 to 100 microns, respectively.

The novel coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a binder or a dispersant or both in a solventborne or aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add flow control additives.

The novel coating composition may be used as a primer or a sealer in which case typical pigments used in primers would be added, such as, carbon black, barytes, silica, iron oxide and other pigments that are commonly used in primers in a pigment-to-binder ratio of 10/100 to 300/100. These primers and sealers exhibit exceptional adhesion to untreated bare metal substrates, such as, aluminum, steel and treated metal substrates, such as, galvanized steel substrates and provide excellent stone chip resistance.

The coating composition can be applied by conventional techniques, such as, spraying, electrostatic spraying, dipping, brushing, and flow coating.

The coating composition is particularly useful for the repair and refinish of automobile bodies and truck bodies and parts as a clear coat, pigmented base coat, mono-coat as a primer, sealer or primer surfacer.

The novel composition has also uses as binder for rapid cure chip coats. The novel composition of this invention can be combined with the isocyanate reagents described above directly without the use of a solvent or additional components and applied to an automobile body directly using application methods known in the art such as integrated multi-component applicators, spray guns or similar devices. Optionally, the combination of the composition of this invention including the typical isocyanate component under simple agitation forms a mass with a desired viscosity profile for direct application to a surface, e.g., a putty, using spatulas or other manual application devices, such as a squeegee.

The novel composition has uses for coating any and all items manufactured and painted by automobile sub-suppliers, frame rails, commercial trucks and truck bodies, including but not limited to beverage bottles, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

The following are testing procedures used in the Examples:

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The number of Oscillations [referred as Persoz No.] are recorded.

Hardness (Fischer)

Hardness was measured using a Fischerscope® Hardness Tester. Measurements are provided in Newtons per square millimeter.

Swelling Ratio

The swelling ratio of the film was determined from the initial drawn down of a coating on a panel of TPO (thermoplastic polyolefin).

After the coating was dry, a free film was lifted off of the TPO using a single edge razor. A circular sample was punched form the film with a 3.1 mm grid punch. The film was positioned between two sheets of aluminum foil and a circular sample 3.1 mm in diameter was punched out and the foil removed and the sample was mounted on a slide. The diameter of the sample was measured with a microscope equipped with a filar micrometer. The original diameter is $D_o$. Methylene chloride was dropped onto the sample and a glass panel was placed over the sample. When the swelling reached equilibrium the swollen diameter of the sample was measured $D_s$. The swelling ratio was then determined. Swell Ratio=$(D_s)^2/(D_o)^2$.

Cotton Tack FreeTime

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off the panel on inversion and note that as the cotton tack free time.

Water Spot Test

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour-timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

BK Dry Time

Surface drying times of coated panels measured according to ASTM D5895.

Time to Gel

The time in minutes it takes for a liquid coating to gel.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

EXAMPLES

The following components were used in the sample evaluations.

Desmodur® 3300—trimer of hexamethylene diisocyanate from Bayer Corporation.

NH 1420-Desmodur® 1420—reaction product of methylene bis (cyclohexyl amine) and diethyl maleate in a 2:1 molar ratio sold by Bayer Corporation, Pittsburgh, Pa.

Coating Evaluation Example Series 1:

Four separate compositions were prepared as follows: 1 equivalent diamine nucleophile (NH 1420), 1.05 eq. Desmodur® 3300, 1500 ppm (parts per million) of the additive except for composition 1 as shown Table 1 (typically as a stock solution in butyl acetate), and the required amount of butyl acetate to produce an 70 wt. % solution were combined in a vial at room temperature. The vial was capped again, and the contents were mixed well using a vortexer. About 1 mL of the solution was then applied to a glass panel, and the dry time was measured with a BK dry time recorder. The time to gel was determined by visual inspection as the point at which the reaction mixture was gelled.

TABLE 1

| Composition | Additive (1500 ppm) | Time to gel (h) | BK 3 (min) | BK 4 (min) |
|---|---|---|---|---|
| 1 | none | 5.2 | 110 | 155 |
| 2 | Ti(OPr)$_4$ | 81 | 61 | 121 |

TABLE 1-continued

| Composition | Additive (1500 ppm) | Time to gel (h) | BK 3 (min) | BK 4 (min) |
|---|---|---|---|---|
| 3 | Ti(OBu)$_4$ | 84 | 65 | 110 |
| 4 | Zr(OPr)$_4$ | >99 | 120 | 290 |

The results in this table show that addition of 1500 ppm of a transition metal alkoxide prevents complete gelling in a closed vial for a time period of several days. The coating film that is exposed to air, however, displays similar dry times to the composition 1 that did not contain an additive. Glass panels were coated with composition 1-4 as above and exposed under a nitrogen atmosphere in a drybox did not cure within 6 hours which further shows that the use of metal alkoxides does not interfere with reaction of the coating.

Coating Evaluation Example Series 2:

Two compositions were prepared as follows: Composition A is a mixture of 1 equivalent diamine nucleophile (NH1420) plus 1.05 eq. Desmodur® 3300 and the required amount of butyl acetate to produce an 70 wt. % solution and were combined in a plastic cup at room temperature, and the contents were mixed well. Composition B is the same as Composition A but contains 5000 ppm of the additive Ti(OPr)$_4$.

Each of the coating compositions was applied with a doctor blade over a separate phosphated cold roll steel panel primed with a layer of PowerCron® Primer supplied by PPG Industries, Pittsburgh, Pa. to a dray coating thickness of about 50 micrometers. One set of panels was air dried at ambient temperature conditions, a second set was baked for 30 minutes at 285° F. (141° C.). Then the panels were tested using the test set forth in the following Table 2 and the results of the test are shown in Table 2.

TABLE 2

| | Composition A Desmodure ® 3300 + NH-1420 | Composition B Desmodure ® 3300 + NH-1420 + 5000 ppm Ti(OPr)$_4$ |
|---|---|---|
| Time to Gel (min.) | 65 | 145 |
| BK3 Time (min.) | 18.9 | 23.62 |
| BK4 Time (min.) | 49.61 | 42.52 |
| Cotton Tack Free Time (min) | 60 | 60 |
| Water Spot | | |
| 4 HR at RT | 10 | 10 |
| 1 DAY at RT | 8 | 8 |
| Swell Ratio | | |
| 1 DAY at RT | 2.03 | 2.07 |
| 7 DAY at RT | 1.91 | 1.96 |
| 30 DAYS at RT | 1.86 | 1.89 |
| 285° F. (141° C.) Bake | 1.93 | 1.98 |
| Persoz Hardness | | |
| 4 HR at RT | 271 | 276 |
| 1 DAY at RT | 292 | 290 |
| Fischer Hardness | | |
| 1 DAY at RT | 102 | 111 |
| 7 DAYS at RT | 110 | 118 |
| 30 DAYS at RT | 117 | 125 |
| 285° F. (141° C.) Bake | 127 | 128 |

RT—room temperature

The results in this table show that addition of 5000 ppm of Ti(OPr)$_4$ in an open plastic cup has the same surprising effect on the time to gel (pot life), wherein an extension of gel time from 65 min (Composition A without additive) to 145 min (Composition B with additive) is observed. The other coating properties, such as BK times, water spots, swell ratios, and hardness, essentially remain unchanged. This evaluation indicates that Ti(OPr)$_4$ scavenges water in the coating and thereby extends the pot life, while its presence does not adversely affect the properties of the film once the film is drawn out and exposed to moisture from the air.

What is claimed is:

1. A coating composition comprising a binder consisting essentially of
   a) polyisocyanate crosslinking agent;
   b) an isocyanate-reactive component having at least one compound having the following formula:

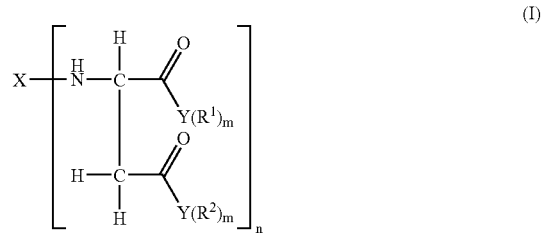

(I)

wherein
X is an aliphatic or cyoloaliphatic group,
wherein
n is, on average, 2-4,
wherein
Y can be independently O or N; if Y is equal to O, m equals 1 and if Y is equal to N, m equals 2;
if Y is equal to O, $R^1$ and $R^2$ are the same or different organic groups that are inert to isocyanate groups,
if Y is equal to N, $R^1$ and $R^2$ are H, or the same or different organic groups that are inert to isocyanate groups with the proviso that at least one of $R^1$ and $R^2$ is not H;
   c) 0.05 to 10% by weight, based on the total weight of the coating composition, of a metal alkoxide compound.

2. The coating composition of claim 1 wherein the metal alkoxide has the following formula $$M(R^3)_q \quad (IV)$$

wherein M is equal to an element or a compound selected from a group consisting of Ti, Zr, Sn, Ce, Al, B, VO, In and Zn, and wherein $R^3$ is a hydroyzable substituent and wherein q is equal to an integer from 2 to 4.

3. The coating composition of claim 2 wherein the metal alkoxide is selected from the group of Ti(OC$_2$H$_5$)$_4$, Ti(OC$_3$H$_7$)$_4$, Ti(O-iso-C$_3$H$_7$)$_4$, Ti(OC$_4$H$_9$)$_4$, Ti(O-iso-C$_4$H$_9$)$_4$, Ti(O-sec-C$_4$H$_9$)$_4$, Ti(2-ethylhexoxy)$_4$, Zr(OC$_2$H$_5$)$_4$, Zr(OC$_3$H$_7$)$_4$, Zr(O-iso-C$_3$H$_7$)$_4$, Zr(OC$_4$H$_9$)$_4$, Zr(2-ethylhexoxy)$_4$, Al(OCH$_3$)$_3$, Al(OC$_2$H$_5$)$_3$, Al(OC$_3$H$_7$)$_3$, Al(O-iso-C$_3$H$_7$)$_3$, Al(OC$_4$H$_9$)$_3$, Al(O-iso-C$_4$H$_9$)$_3$, Al(O-sec-C$_4$H$_9$)$_3$, B(OCH$_3$)$_3$, B(OC$_2$H$_5$)$_3$, B(OC$_3$H$_7$)$_3$, B(O-iso-C$_3$H$_7$)$_3$, B(OC$_4$H$_9$)$_3$, Sn(OCH$_3$)$_4$, Sn(OC$_2$H$_5$)$_4$, VO(OCH$_3$)$_3$, Al(OC$_2$H$_5$)$_3$, Al(OC$_3$H$_7$)$_3$, Al(O-iso-C$_3$H$_7$)$_3$, Ce(OC$_4$H$_9$)$_4$, Ce(O-iso-C$_4$H$_9$)$_4$, and Ce(2-ethylhexoxy)$_4$.

4. The coating composition of claim 2 wherein the metal alkoxide has the formula (Ti)$_h$(O)$_i$(O R$^8$)$_j$ wherein $R^8$ is an organic radical having 1-20 carbon atoms, h is an integer of at least 2, i is an integer of at least 1 and j is an integer of at least 4.

5. The coating composition of claim 2 wherein n is 2, Y is N, m equals 2 and $R^1$ and $R^2$ are H or the same or different organic groups that are inert to a reaction with isocyanate groups provided that at least one of $R^1$ and $R^2$ are not H.

6. The coating composition of claim 2 wherein n is 2, Y is O, m equals 1 and $R^1$ and $R^2$ are the same or different organic groups that are inert to a reaction with isocyanate groups.

7. The coating composition of claim 1 containing an acrylic polymer component having a number average molecular weight of 5,000 to 50,000 and having reactive groups that crosslink with an isocyanate, where the reactive groups are selected from the group consisting of hydroxyl, carboxyl, glycidyl, amine and any mixtures thereof.

8. The coating composition of claim 1 containing an oligomeric component having a number average molecular weight of 300 to 3,000 having reactive groups that crosslink with an isocyanate, where the reactive group are hydroxyl, carboxyl, glycidyl, amine, aldimines, phosphoric acid, ketimine and any mixtures thereof.

9. The coating composition of claim 1 wherein the binder contains 1 to 60% by weight, based on the weight of the binder, of an acrylic polymer having a number average molecular weight of 5,000 to 50,000 and having groups reactive with isocyanate.

10. The coating composition of claim 9 wherein the acrylic polymer consists essentially of polymerized monomers selected from the group consisting of linear alkyl (meth) acrylates having 1 to 12 carbon atoms in the alkyl group cyclic or branched alkyl (meth)acrylates having 3 to 12 carbon atoms in the alkyl group, isobornyl (meth)acrylate, styrene, alpha methyl styrene, vinyl toluene, (meth)acrylonitrile, (meth)acryl amides, and mixtures thereof and polymerized monomers that provide groups reactive with isocyanate selected from the group consisting of hydroxy alkyl (meth) acrylates, glycidyl (meth)acrylates, amino alkyl(meth) acryaates and (meth)acrylic acid.

11. The coating composition of claim 10 wherein the acrylic polymer has a hydroxyl equivalent weight of 300 to 1300 and consists essentially of polymerized monomers selected from the group consisting of alkyl (meth)acrylates having 1 to 12 carbon atoms in the alkyl group, cyclic or branched alkyl (meth)acryiates having 3 to 12 carbon atoms in the alkyl group, isobomyl methacrylate, styrene, alpha methyl styrene, (meth)acrylonitrile, (meth)acryl amides, and polymerized monomers consisting of hydroxy alkyl (meth) acrylates having 1 to 4 carbon atoms in the alkyl group.

12. The coating composition of claim 1 wherein the binder contains 1 to 60% by weight, based on the weight of the binder, of an acrylic oligomer having a number average molecular weight of 300 to 3,000 and having groups reactive with isocyanate selected from the group consisting of hydroxyl, carboxyl, glycidyl, amine, aldimines, phosphoric acid, ketimine and any mixtures thereof.

13. The coating composition of claim 12 wherein the oligomer consists essentially of polymerized monomers selected from the group consisting of linear alkyl (meth) acrylates having 1 to 12 carbon atoms in the alkyl group, cyclic or branched alkyl (meth)acrylates having 3 to 12 carbon atoms in the alkyl group isobornyl (meth)acrylate, styrene, alpha methyl styrene, vinyl toluene, (metha)crylonitrile, (meth)acryl amides, and mixtures thereof and polymerized monomers that provide groups reactive with isocyanate selected from the group consisting of hydroxy alkyl (meth) acrylates, glycidyl (meth)acrylates, amino alkyl(meth)acrylates and (meth)acrylic acid.

14. The coating composition of claim 1 wherein the polyisocyanate is selected from the group consisting of aliphatic polyisocyanates, cycloaliphatic polyisocyanates, aromatic polyisocyanates and isocyanate adducts.

15. The coating composition of claim 14 in which the polyisocyanate is selected from the group consisting of isophorone dilsocyanate, hexamethylene dilsocyanate, trimer of hexamethylene diisocyanate and a trimer of isophorone dilsocyanate.

16. The coating composition of claim 1 wherein the binder contains 1 to 60% by weight, based on the weight of the binder, of a polyester having hydroxyl groups.

17. The coating composition of claim 1 wherein the binder contains 1 to 60% by weight, based on the weight of the binder, of a urethane oligomer that is the reaction product of a polyisocyanate selected from the group consisting of an aliphatic polyisocyanate and a cycloaliphatic polyisocyanate; a hydroxy functional aliphatic carboxylic acid and a monohydric alcohol selected from the group consisting of aliphatic monohydric alcohol and cycloaliphatic monohydric alcohol.

18. The coating composition of claim 17 wherein the urethane oligomer consists essentially of the reaction product of the isocyanurate of hexane dilsocyanate, cyclohexanol, dimethylol propionic acid.

19. The coating composition of claim 1 containing 1 to 30% by weight, based on the weight of the binder, of a non-aqueous acrylic polymer dispersion.

20. The coating composition of claim 1 containing pigment in a pigment to binder weight ratio of 0.1/100 to 200/100 that is useful as a mono-coat top coating composition.

21. The coating composition of claim 1 containing pigment in a pigment to binder weight ratio of 10/100 to 300/100 that is useful as a primer or sealer composition.

22. The coating composition of claim 1 useful as a putty.

23. The coating composition of claim 1 which contains about 0.1% to 5% by weight, based on the weight of the binder, of a di-substituted phenol antioxidant or a hydroperoxide decomposer.

24. The coating composition of claim 1 which contains about 0 1% to 5% by weight, based on the weight of the binder, of an ultraviolet light absorber.

25. The coating composition of claim 1 which contains about 0.1% to 5% by weight, based on the weight of the binder, of a hindered amine light stabilizer.

26. A substrate coated with the composition of claim 1.

27. The substrate of claim 26 in which the substrate is untreated bare metal.

28. The substrate of claim 27 in which the untreated bare metal substrate comprises aluminum or steel.

29. The substrate of claim 26 in which the substrate is galvanized steel.

30. A substrate having a base coating of a pigmented coating composition, which is top coated with a clear coating of the composition of claim 1.

31. A substrate having a multi-layer coating comprising a pigmented primer coating of the composition of claim 1, a base coating of a pigmented coating composition, and a top-coating of a clear coating composition.

32. The substrate of claim 31 wherein the top coating comprises a clear coating of the composition of claim 1.

33. A process for coating en auto body or auto part which comprises
   applying a base coating of a pigmented coating composition to a substrate;
   applying a top-coating of a clear coating of the composition of claim 1 over the base coating and
   curing the base coating and top-coating to form a base coat/clear coat finish on the substrate.

34. An auto body or auto part coated with the composition of claim 1.

35. A two component coating composition comprising
Component A comprising a polyisocyanete crosslinking agent; and Component B comprising an isocyanate-reactive component having at least one compound having the following formula:

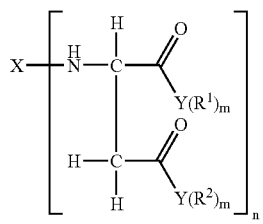
(I)

wherein

X is an aliphatic or cycloaliphatic group, wherein n is, on average, 2 to 4, wherein Y can be independently O or N; if Y is equal to O, m equals 1 and if Y is equal to N, m equals 2;

if Y is equal to O, $R^1$ and $R^2$ are the same or different organic groups that are inert to isocyanate groups, if Y is equal to N, $R^1$ and $R^2$ are H, or the same or different organic groups that are inert to isocyanate groups with the proviso that at least one of $R^1$ and $R^2$ is not H; and 0.05 to 10% by weight, based on the total weight of the coating composition, of a metal alkoxide compound;

wherein components A and B are thoroughly mixed together before application to a substrate.

* * * * *